United States Patent
Iyer et al.

(10) Patent No.: US 11,372,380 B2
(45) Date of Patent: Jun. 28, 2022

(54) MEDIA-TO-WORKFLOW GENERATION USING ARTIFICIAL INTELLIGENCE (AI)

(71) Applicant: UiPath, Inc., New York, NY (US)

(72) Inventors: Kartik Iyer, Karnataka (IN); Radhakrishnan Iyer, Karnataka (IN); Naveen Kumar M., Karnataka (IN)

(73) Assignee: UiPath, Inc., New York, NY (US)

( * ) Notice: Subject to any disclaimer, the term of this patent is extended or adjusted under 35 U.S.C. 154(b) by 291 days.

(21) Appl. No.: 16/703,742

(22) Filed: Dec. 4, 2019

(65) Prior Publication Data

US 2021/0109487 A1    Apr. 15, 2021

(30) Foreign Application Priority Data

Oct. 15, 2019  (IN) .............................. 201911041765

(51) Int. Cl.
G05B 13/02    (2006.01)
G06N 20/00    (2019.01)

(52) U.S. Cl.
CPC ......... G05B 13/0265 (2013.01); G06N 20/00 (2019.01)

(58) Field of Classification Search
CPC ............................ G05B 13/0265; G06N 20/00
USPC .................................................... 700/28–55
See application file for complete search history.

(56) References Cited

U.S. PATENT DOCUMENTS

| | | | |
|---|---|---|---|
| 9,087,236 B2 | 7/2015 | Dhoolia et al. | |
| 10,048,946 B2 | 8/2018 | Krishnan et al. | |
| 2012/0213429 A1 | 8/2012 | Vasudevan et al. | |
| 2018/0197123 A1* | 7/2018 | Parimelazhagan | G06F 16/951 |
| 2019/0087395 A1* | 3/2019 | Priestas | G06F 40/169 |
| 2019/0354720 A1* | 11/2019 | Tucker | G06N 5/02 |
| 2020/0159571 A1* | 5/2020 | V V Ganeshan | G06F 16/1794 |
| 2020/0371818 A1* | 11/2020 | Banne | G06F 40/20 |

FOREIGN PATENT DOCUMENTS

| | | |
|---|---|---|
| JP | H08190584 A | 7/1996 |
| JP | 2019523425 A | 8/2019 |
| KR | 101345068 B1 | 12/2013 |
| KR | 1020160146088 A | 12/2016 |

(Continued)

OTHER PUBLICATIONS

Ratia, M., Jussi Myllärniemi, and Nina Helander. "Robotic process automation-creating value by digitalizing work in the private healthcare?." Proceedings of the 22nd International Academic Mindtrek Conference. 2018.pp. 222-227 (Year: 2018).*

(Continued)

*Primary Examiner* — Satish Rampuria
(74) *Attorney, Agent, or Firm* — LeonardPatel PC

(57) ABSTRACT

A robotic process automation (RPA) workflow may be automatically created from text, an image, and/or a media file. A workflow sequence may be converted into a digital format using optical character recognition (OCR), and this information may then be analyzed by an artificial intelligence (AI) model and converted into a predicted RPA workflow. The predicted RPA workflow may be presented to a developer for approval, denial, or modification. Information pertaining to the selection by the developer may then be used for subsequent retraining of the AI model to improve prediction accuracy.

30 Claims, 13 Drawing Sheets

(56) References Cited

FOREIGN PATENT DOCUMENTS

WO 2017091387 A2 6/2017

OTHER PUBLICATIONS

Kuhn, Wolfgang. "Digital factory-simulation enhancing the product and production engineering process." Proceedings of the 2006 winter simulation conference. IEEE, 2006.pp. 1899-1906 (Year: 2006).*
Leopold, Henrik, Han van der Aa, and Hajo A. Reijers. "Identifying candidate tasks for robotic process automation in textual process descriptions." Enterprise, business-process and information systems modeling. Springer, Cham, 2018. pp. 67-81. (Year: 2018).*
Lopes, Carlos R., and Jony T. Melo. "Business Improvement through Automatic Workflow Modeling." ICE-B. 2006.pp. 227-234 (Year: 2006).*
Weld, Daniel S., Christopher H. Lin, and Jonathan Bragg. "Artificial intelligence and collective intelligence." Handbook of collective intelligence (2015): pp. 89-114. (Year: 2015).*
European Search Report, dated Jan. 18, 2021, EP Patent Application No. 20200833.0.
Yolanda Gil, et al., "Workflow Matching Using Semantic Metadata", Proceedings of the Fifth International Conference on Knowledge Capture (K-CAP), Redondo Beach, CA, Sep. 1-4, 2009.
Office Action dated Nov. 16, 2021, KR Patent Application No. 10-2020-0123219.

* cited by examiner

```
Sequence Start:
---v_result <- v_form_details
---
----#Excel Scope
------#WriteRange
--------"form_details_1.xlsx"
--------v_form_details
----
----#Log Message
------"Successfully Written"
Sequence End:
```

Sample Image Input

Before Modification

During Modification Deleting

1200

After Modification

MEDIA-TO-WORKFLOW GENERATION USING ARTIFICIAL INTELLIGENCE (AI)

CROSS-REFERENCE TO RELATED APPLICATION

This application claims the benefit and priority under 35 U.S.C. §119 of Indian Patent Application No. 201911041765 filed on Oct. 15, 2019. The subject matter of these earlier filed applications is hereby incorporated by reference in its entirety.

FIELD

The present invention generally relates to robotic process automation (RPA), and more specifically, to using deep learning (DL) or AI to automatically create a workflow from text, images, audio, or any combination thereof.

BACKGROUND

RPA workflows may be developed in a suitable environment or application (e.g., UiPath Studio™). However, when a developer is not using the studio application to develop RPA workflows (e.g., when the developer is commuting or performing other tasks), the workflow is not initially captured in the studio application. In those instances, the developer may write out a sequence of logic steps on paper, as text in a text or document editor (e.g., Notepad™ or Microsoft Word™), or via any other suitable capture mechanism, and then manually create the workflow in the RPA workflow development application at a later time. In these cases, the effort to generate the workflow is duplicative.

There are existing solutions that provide drag and drop functionality for building RPA workflows without requiring the developer to write code. For instance, UiPath Studio™ provides such functionality. However, this still requires the developer to manually reproduce the workflow that he or she created outside of the RPA workflow development application. For example, assuming that the user has an idea of how his or her workflow should be designed and defined, the user must go to the studio application and manually drag and drop the activities one after the other including the background Sequence, Excel activity, Log message, etc. In addition to this, he or she also must identify the datatypes and define the variables to be used. This results in considerable investment of time and effort, which can be minimized.

And hence, an improved approach may be beneficial.

SUMMARY

Certain embodiments of the present invention may provide solutions to the problems and needs in the art that have not yet been fully identified, appreciated, or solved by RPA techniques. For example, some embodiments of the present invention pertain to automatically creating an RPA workflow from a source external to an RPA workflow development application using AI.

In an embodiment, a computer-implemented method for creating a RPA workflow includes receiving a media file comprising a proposed workflow by way of a workflow development application on a computing system, and forwarding the received media file of the proposed workflow to a workflow generation module for processing. The method may also include accessing, by the workflow generation module, a model database to pull one or more workflow models. The method may further include loading, by the workflow generation module, the one or more workflow models and predicting one or more workflows for a user of the computing system to select. The method yet also include transmitting, from the workflow generation module, a list of possible XAML files comprising the one or more workflows to the workflow development application for the user to select.

In another embodiment, a computer program embodied on a non-transitory computer-readable medium is configured to cause at least one processor to receive a media file comprising a proposed workflow by way of a workflow development application on a computing system. The computer program is further configured to cause the at least one processor to forward the received media file of the proposed workflow to a workflow generation module for processing, and access, by the workflow generation module, a model database to pull one or more workflow models. The computer program is also configured to cause the at least one processor to load, by the workflow generation module, the one or more workflow models and predicting one or more workflows for a user of the computing system to select. The computer program is further configured to cause the at least one processer to transmit, from the workflow generation module, a list of possible XAML files comprising the one or more workflows to the workflow development application for the user to select.

In yet another embodiment, a computer system includes memory storing machine-readable computer program instructions, and at least one processor configured to execute the computer program instructions. The instructions are configured to cause the at least one processor to receive a media file comprising a proposed workflow by way of a workflow development application on a computing system, and forward the received media file of the proposed workflow to a workflow generation module for processing. The instructions are further configured to cause the at least one processor to access, by the workflow generation module, a model database to pull one or more workflow models. The instructions are also configured to cause the at least one processor to load, by the workflow generation module, the one or more workflow models and predicting one or more workflows for a user of the computing system to select. The instructions are further configured to cause the at least one processor to transmit, from the workflow generation module, a list of possible XAML files comprising the one or more workflows to the workflow development application for the user to select.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to automatically creating a robotic process automation (RPA) workflow from text, images, audio, or any combination thereof. In some embodiments, using a trained AI model, the RPA workflow is created from a sequence of logic steps written in a text file, from an image containing the sequence of logic steps, from an audio file containing the sequence of logic steps, any other suitable mechanism for conveying the logic steps, or any combination thereof. The trained AI model may understand the sequence of logic steps and automatically create the RPA workflow in an extensible application markup language (XAML) file format in some embodiments. In some embodiments, the trained AI model may provide suggestions to the developer, who may have drafted the sequence of logic steps, with multiple RPA workflows that can be used by the developer in the RPA workflow development application by selecting one of the suggested RPA workflows. Some embodiments allow the developer to make use of an intelligently generated RPA workflow, reducing development time and effort in the workflow development lifecycle.

Figure 1:
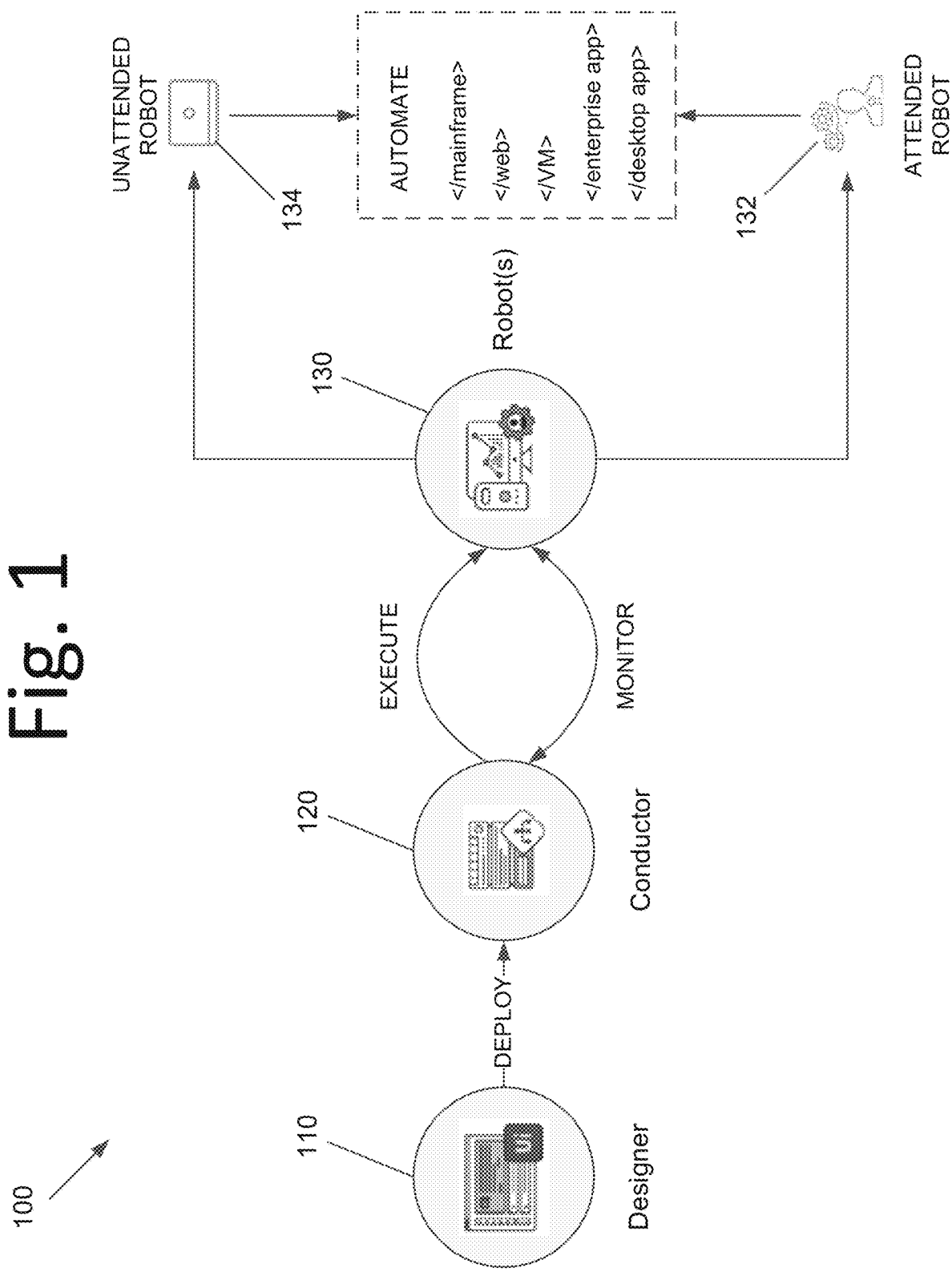
FIG. 1 is an architectural diagram illustrating an RPA system, according to an embodiment of the present invention.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level sin some embodiments. For applications that are DPI-unaware or intentionally marked as unaware, DPI may be disabled in some embodiments.

Figure 2:
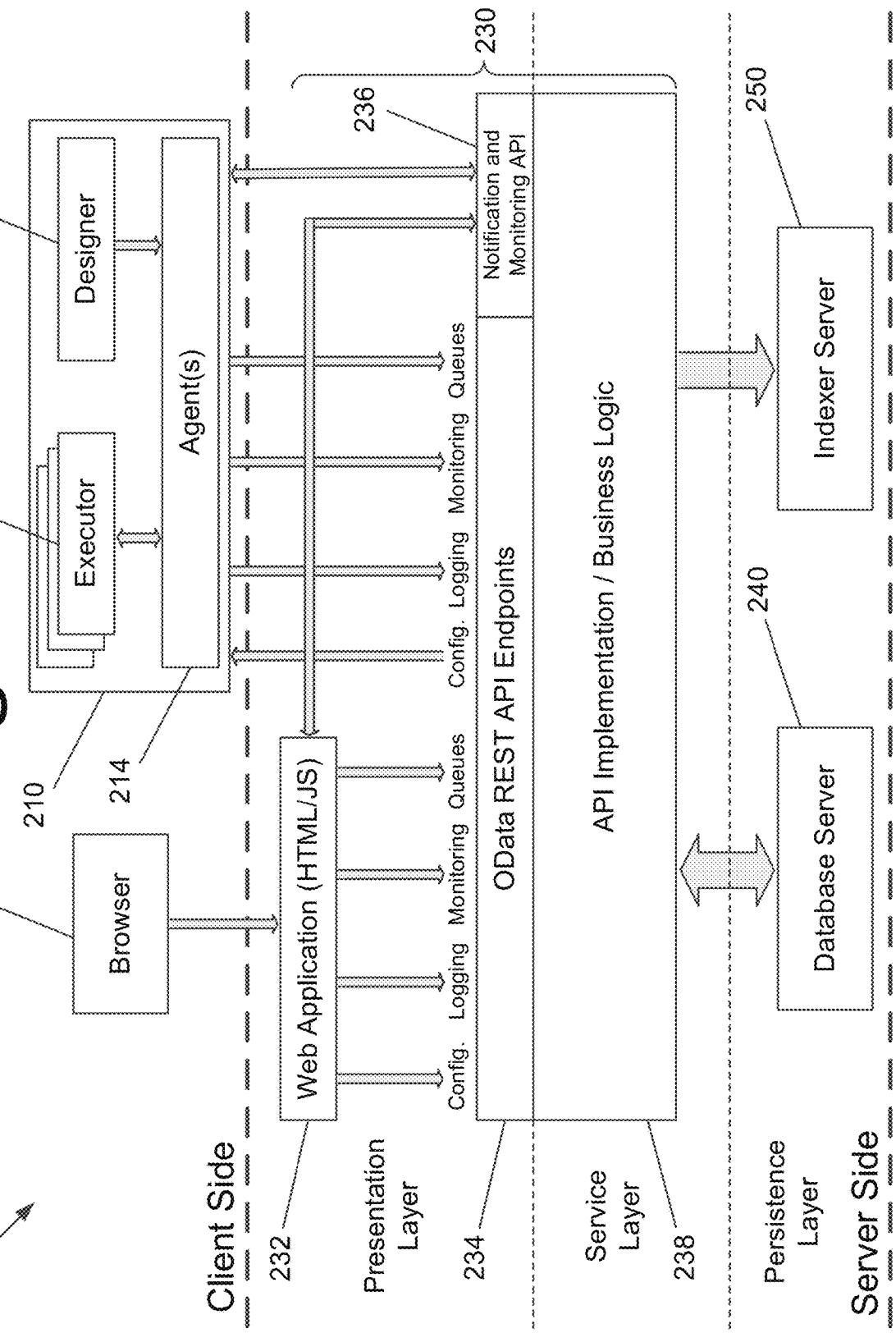
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
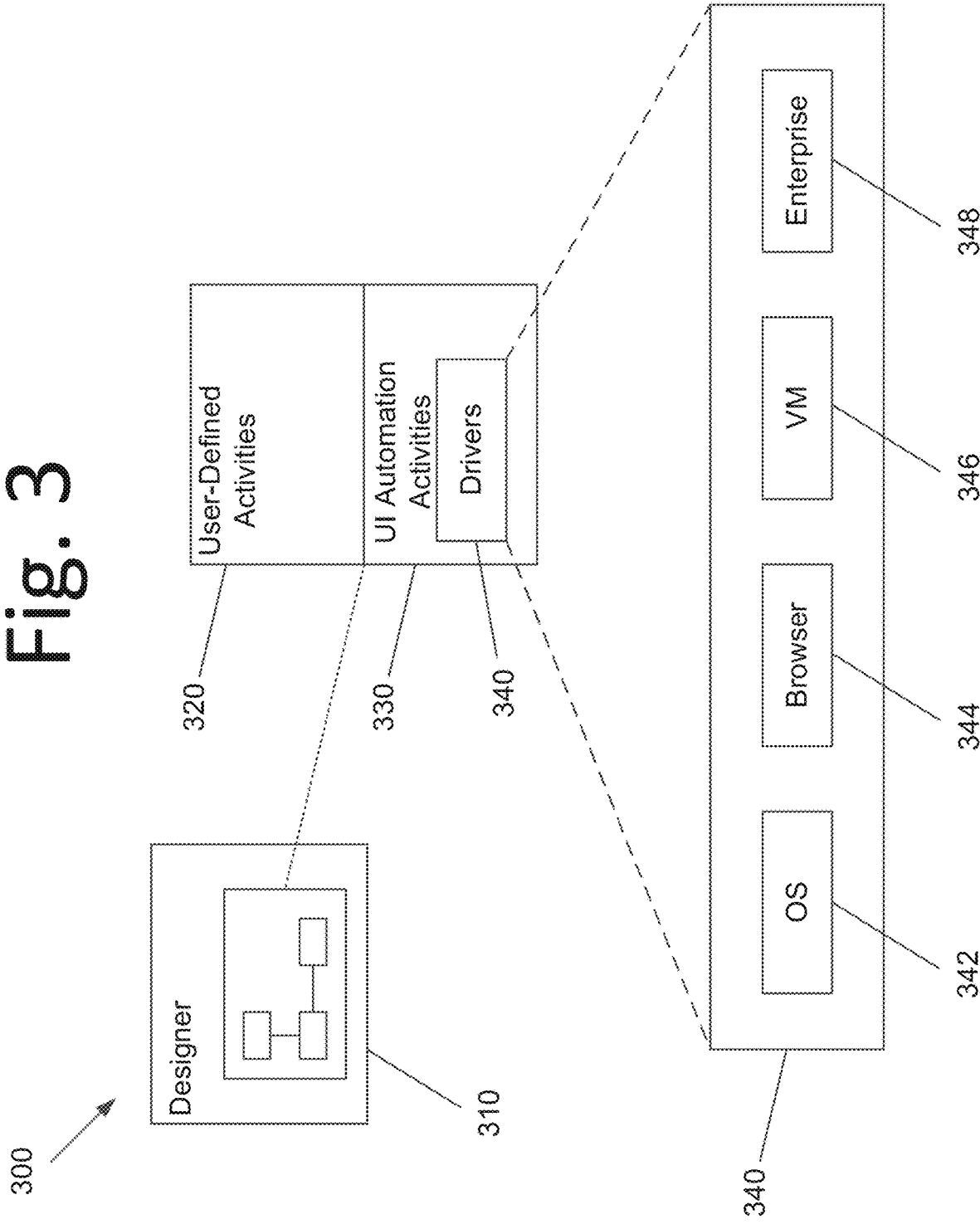
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some computer vision (CV) activities may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 40 may interact with the OS at a low level looking for hooks, monitoring for keys, etc. They may facilitate integration with Chrome®, IE®, Citrix SAP®, etc. For instance, the "click" activity performs the same role in these different applications via drivers 340.

Figure 4:
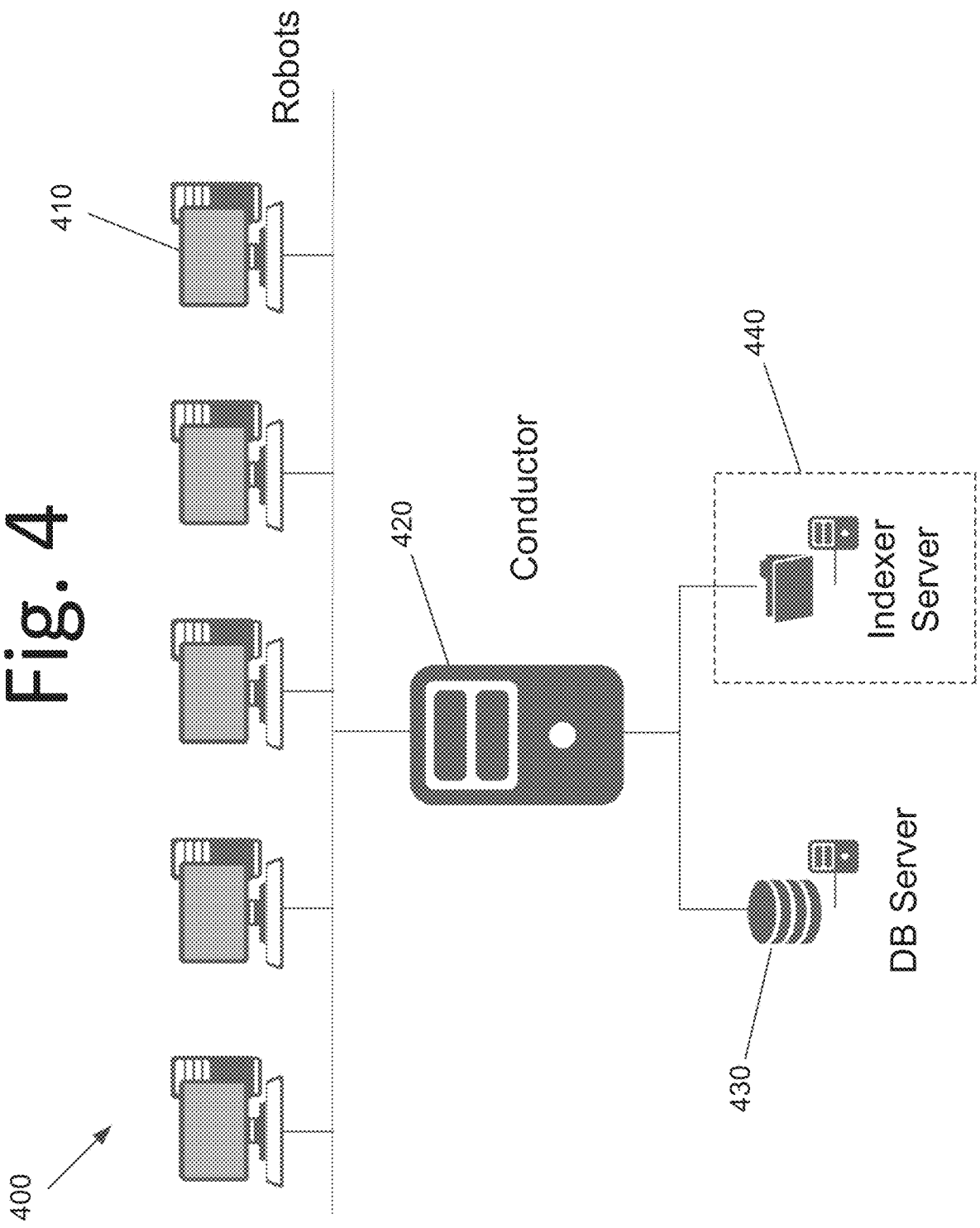
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
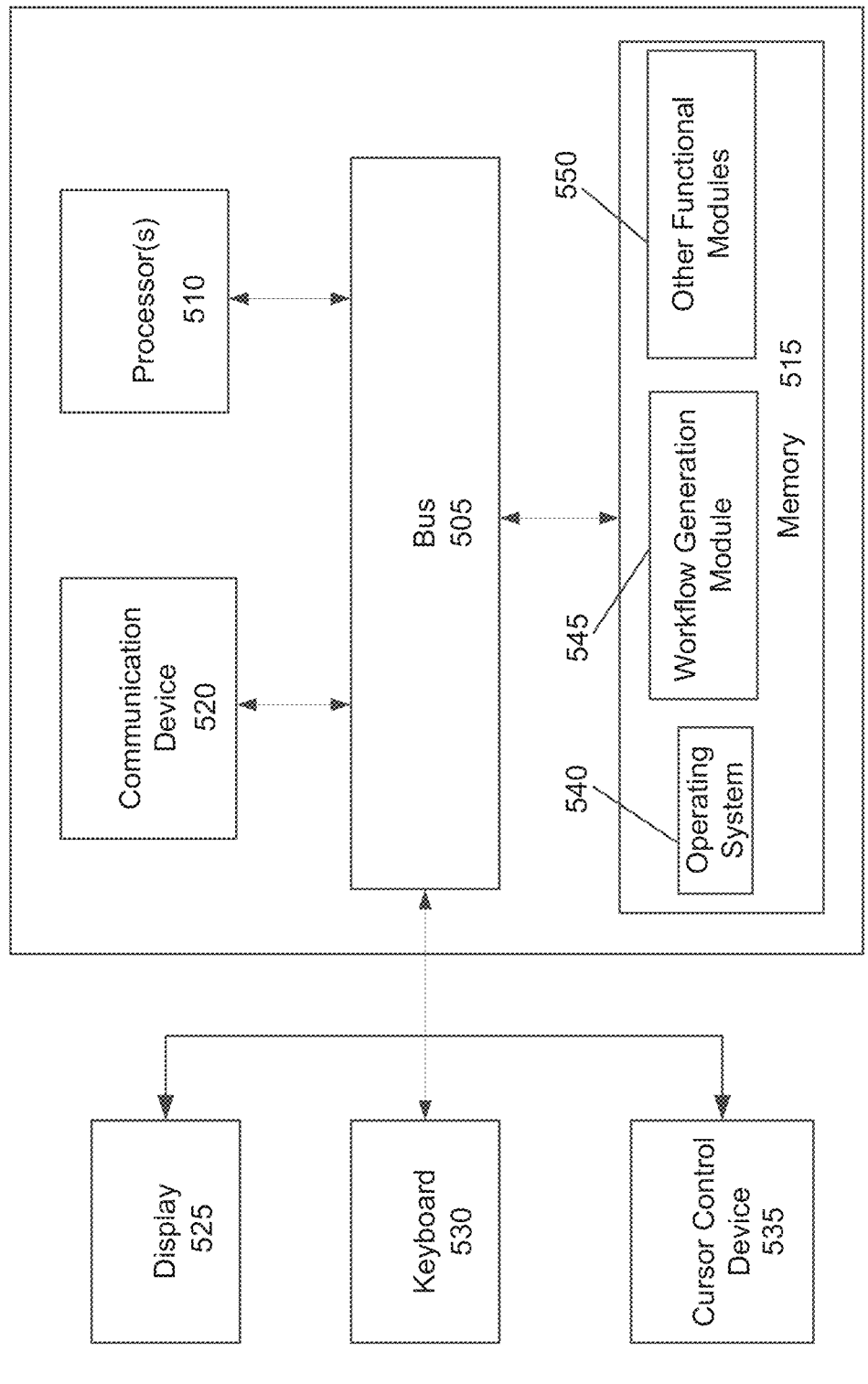
FIG. 5 is an architectural diagram illustrating a computing system configured to automatically generate an RPA workflow, according to an embodiment of the present invention.

FIG. 5 is an architectural diagram illustrating a computing system 500 configured to automatically generate an RPA workflow, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500.

The modules further include a workflow generation module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

RPA Workflow Generation

RPA workflows may be created based on a sequence of logic steps. This sequence may be written and stored in a text file in some embodiments, however, any other suitable mechanism for capturing the steps may be used without deviating from the scope of the invention. For example, when the sequence of logic steps is written on a piece of paper, the sequence may be captured in an image. In another example, the sequence may be spoken and recorded/captured in an audio file. In these examples, the sequence(s) may include flowcharts, block diagrams, or both.

In some embodiments, a developer or any other individual interested in creating automated processes writes the sequence in a text designer module of the RPA workflow development application. However, any desired text editor or document editor, such as a MS Word®, may be used without deviating from the scope of the invention. When a third party text editor or document editor is used, a copy of the text may be pasted in the text designer module of the RPA workflow development application to create the RPA workflow.

In certain embodiments, the developer writes a sequence, a flowchart, and/or a block diagram on a piece of paper. An image of the sequence, the flowchart, and/or the block diagram is then captured by a photo application, an image capture module associated with the RPA workflow development application, or via any other suitable mechanism without deviating from the scope of the invention. In some embodiments, the image capture module may include an option to upload the captured image. In certain embodiments, an application may capture audio in addition to or in lieu of the image.

Upon uploading a captured image and/or uploading the audio file, an RPA workflow generation module of the RPA workflow development application may perform OCR on the captured image and/or perform speech-to-text recognition on the captured audio file to convert this information into a digital format. The RPA workflow generation module may then create an RPA workflow based on a trained AI model. The trained AI model may provide the RPA developer with one or more workflows and may allow the developer to select one or more of these workflows.

The AI model is trained on XAML file dataset, in some embodiments. XAML files are essentially contain workflows. The input data is passed in a common format (explained in the preprocessing section) to the AI model. The AI model may consume this input and then predict the respective activities. The format of this predicted output is a XAML file.

If the workflow generated by the RPA workflow development application is not suitable for the developer, he or she can reject the workflow in some embodiments. In certain embodiments, the developer may reject the workflow by selecting another workflow. The RPA developer's selection(s) may be used as feedback for the workflow generation module to retrain itself and recommend better workflows in the future. In some embodiments, a batch of selection information may be collected over a time period, and this information may then be used for retraining.

The workflow generation module may thus be further improved over time, and may generate more accurate and powerful workflows as it is retrained. In certain embodiments, the developer may use this approach to build a full-fledged workflow or build simple sequences of activities.

Figure 6:
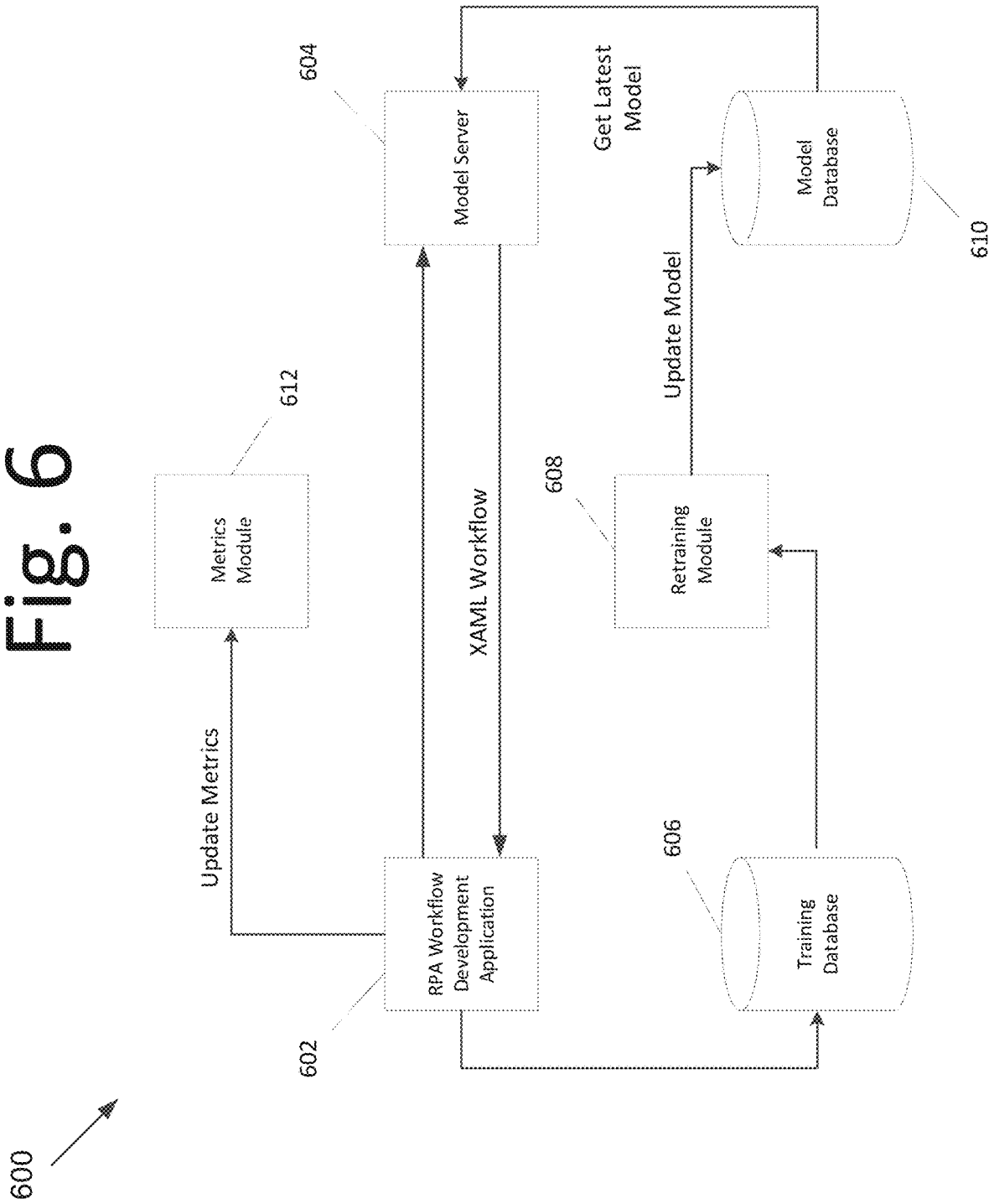
FIG. 6 is a flow diagram illustrating a system for automatically generating RPA workflows, according to an embodiment of the present invention.

FIG. 6 is a flow diagram illustrating a system 600 for automatically generating RPA workflows, according to an embodiment of the present invention. In some embodiments, the RPA developer or workflow creator uploads text file(s), image file(s), audio file(s), or any combination thereof (collectively, the "file") containing a sequence of logic steps to RPA workflow development application 602. RPA workflow development application 602 then converts the file containing the sequence to a digital format, or has the file converted to a digital format by a third party OCR application, and sends the digital format to a model server 604 for preprocessing.

Preprocessing is performed based on the following media types:
  Image: Extract text using OCR engine.
  Speech: Use a speech-to-text engine to convert the audio into a text file.
  Text: Along with the above output and text input will be further preprocessed like the removal of stop-words, punctuation, etc.

Model server 604 may predict the workflow using the AI model(s) stored in model database 610. From the above pre-processing step, text is fed into the AI model, which has been trained in a supervised manner with the annotated workflow dataset (XAML format). For the respective text input, the AI model extracts the features and predicts the workflow with certain probability scores. Based on these probability scores, the workflow is generated and presented to the user.

After predicting the workflow(s) (e.g., identifying one or more workflows that appear to be candidates with at least a minimum confidence threshold in some embodiments), model server 604 returns the predicted RPA workflow(s) to RPA workflow development application 602. In some embodiments, the predicted RPA workflow(s) are provided as a set of XAML files. Based on the prediction probability scores, one or more workflows are generated. In an embodiment, the user can set the probability score threshold, and if more than one workflow matches the threshold, separate workflows are presented to the user. Even in the case where the input is ambiguous, the AI model, based on the previous learnings, can produce multiple workflows and present the workflows to the user.

RPA workflow development application 602 may enable the developer to use the predicted workflow(s). Additionally or alternatively, in some embodiments, the developer may modify the predicted workflow(s) or reject the predicted workflow(s) via RPA workflow development application 602. If the predicted workflow(s) is/are approved or modified by the developer, RPA workflow development application 602 may send the approved or modified workflow to training database 606 for storage. Training database 606 may forward the stored approved or modified RPA workflow to training module 608 so the workflow can be used for retraining the AI model in the future.

If the predicted workflow does not meet the user's use case, he or she can correct the workflow as per his requirement and then use the upload button in the designer tab to feed the corrected workflow as an input training data to the AI model for retraining purpose. The workflows that are uploaded as a part of feedback are annotated further before retraining the model. Once the model is retrained, it will be evaluated against a validation dataset, and if the metrics are better than the previous model, the updated model will be pushed into the model database.

After retraining occurs, the retrained model of the approved or modified workflow is then stored in model database 610 for subsequent use.

In certain embodiments, model database 610 stores AI models and associated information. In some embodiments, AI models and associated information may be defined as the files that contain learned features obtained after the training process Metrics module 612 may contain the standard metrics used in the AI domain like precision, recall and f1 score, etc.

These metrics are given an insight about the performance and efficiency of the AI model.

Figure 7:
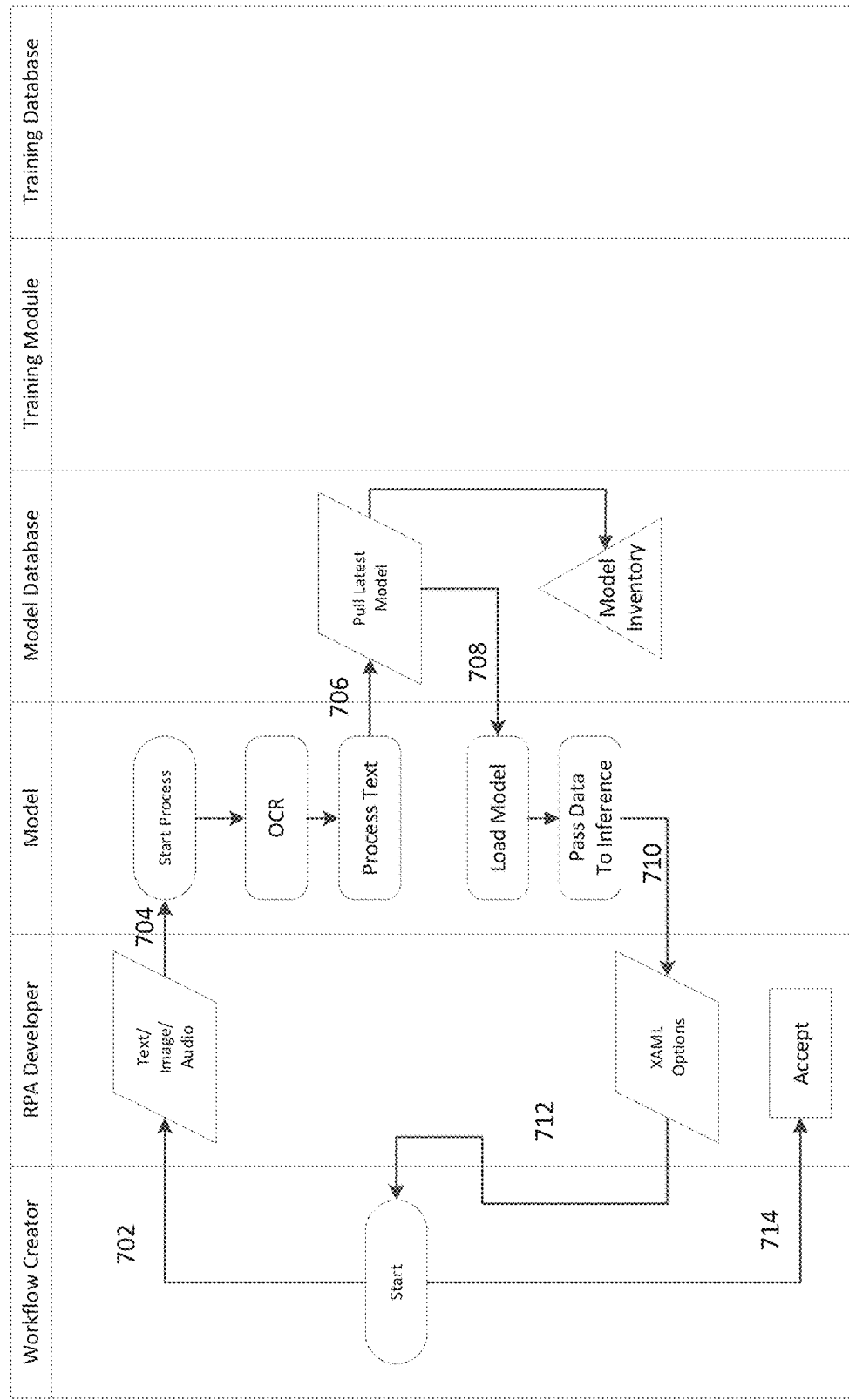
FIG. 7 is flow chart illustrating an RPA workflow generation process, according to an embodiment of the present invention.

FIG. 7 is flow chart illustrating an RPA workflow generation process 700, according to an embodiment of the present invention. In some embodiments, the developer uploads text file(s), image file(s), audio file(s), or any combination thereof (collectively, the "file") containing a sequence of logic steps via an RPA workflow development application at 702. In some embodiments, a specified text editing tool, imaging tool, and/or audio tool may be incorporated within the RPA workflow development application in order to facilitate uploading of the file.

At 704, once the input file is uploaded, the file is sent to a workflow generation module (or "model"). The workflow generation module is responsible for pre-processing the file, loading the AI model, and making the prediction. In some embodiments, if the sequence is captured in an image file, the workflow generation module performs OCR, or causes OCR to be performed, to capture the text. In certain embodiments, if the sequence is captured in an audio file, the workflow generation module performs speech-to-text recognition, or causes speech-to-text recognition to be performed, to capture the spoken text. Once the text has been captured, the text may then be processed to predict the workflow.

At 706, the workflow generation module accesses the model database to pull the most recent workflow model(s). This will be the AI model, which has the best scores till now, which will be used for prediction. The comparison here is with the scores of the previously trained models with the current model. The workflow model(s) may be pulled from the workflow model inventory, which stores the previously stored workflow models.

At 708, the workflow generation module loads the workflow model(s), and predicts the workflow using the preprocessed text from step 704. At 710, the workflow generation module transmits a list of possible XAML files to the RPA workflow development application based on the prediction(s). At 712, the RPA workflow development application displays the list of possible XAML files for the developer to select. Workflows are generated and downloaded in a separate folder inside the project scope, which can be viewed in the UiPath Studio Project™ view, for example. Clicking on the file opens the file in the UiPath Studio Project™. The list of possible XAML files pertain to different workflows available for selection by the developer. At 714, the RPA workflow development application receives the selection from the developer, producing the selected workflow.

Text-to-Workflow Generation

Figure 8:
FIG. 8 is a graphical user interface (GUI) illustrating a user's workflow text, according to an embodiment of the present invention.

In text-to-workflow generation, in some embodiments, the developer opens the RPA workflow development application and selects a text editor thereof. Within the text editor, the developer may write a sequence of logic steps in some embodiments. See, for example, FIG. 8, which is a graphical user interface (GUI) 800 illustrating a sequence of logic steps in the form of text to be converted into an RPA workflow, according to an embodiment of the present invention. It should be appreciated that in some embodiments, the developer may write the sequence of logic steps in a text or document editor. In such embodiments, the developer may copy-and-paste the steps into the text editor of the RPA workflow development application.

Figure 10:
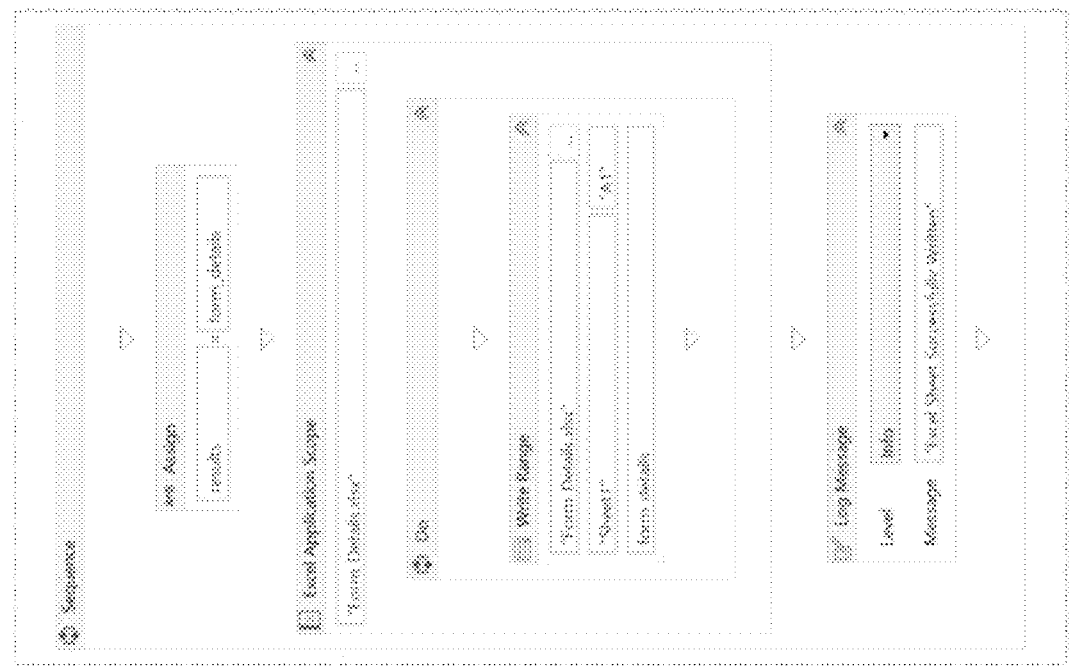
FIG. 10 is an image illustrating the RPA workflow created from the user text of FIG. 8, according to an embodiment of the present invention.
Figure 11:
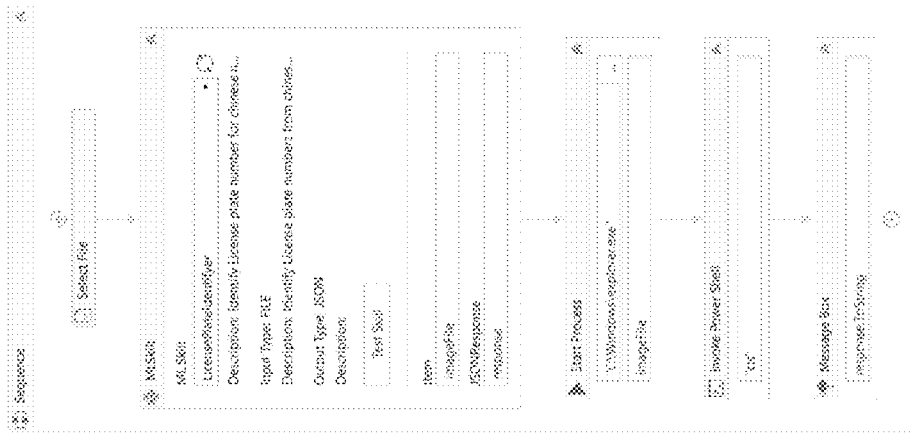
FIG. 11 is an image illustrating a workflow created from a media file prior to a user modifying the workflow, according to an embodiment of the present invention.
Figure 12:
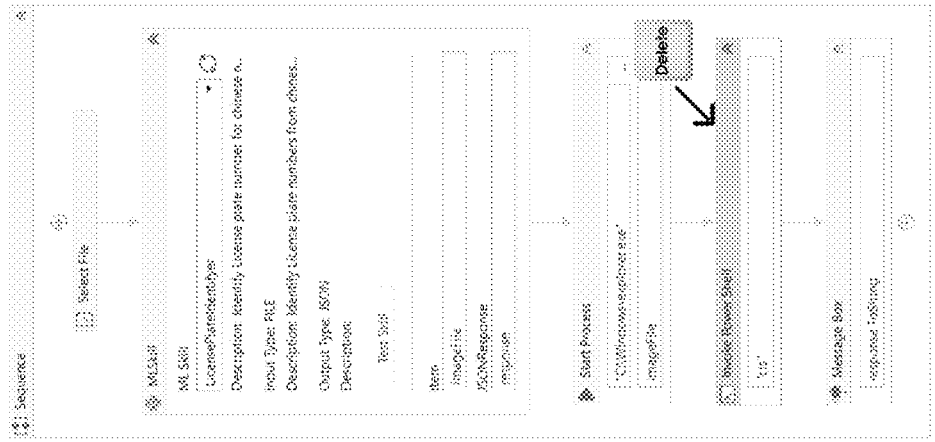
FIG. 12 is an image illustrating a workflow created from a media file during user modification of the workflow, according to an embodiment of the present invention.
Figure 13:
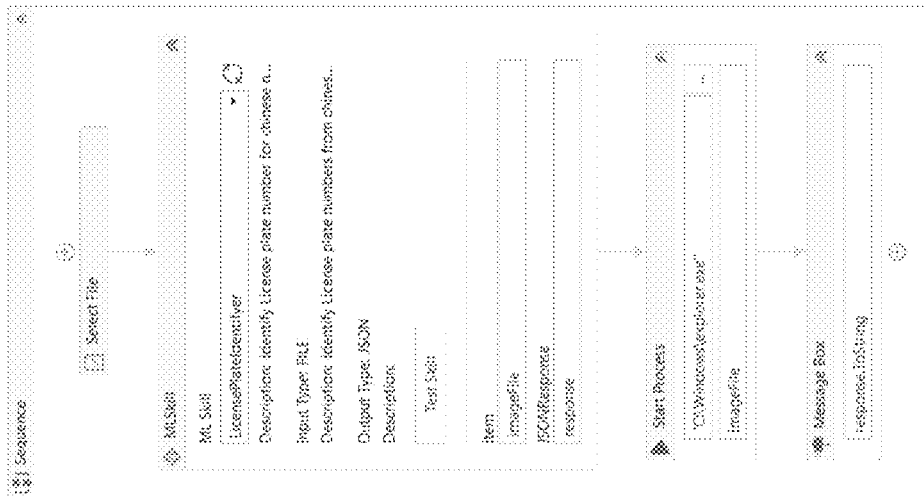
FIG. 13 is an image illustrating a workflow created from a media file after user modification of the workflow is completed, according to an embodiment of the present invention.

After entering the text in the text editor, the developer may click on a "GENERATE" button, for example. This triggers the AI model to build the workflow using the text and return the generated workflow in XAML format. See, for example, FIG. 10, which is an image 900 illustrating the RPA workflow created from the text of FIG. 8, according to an embodiment of the present invention. The generated RPA workflow may then be shown to the developer in the RPA workflow development application. After the RPA workflow is generated, the developer may use the workflow, reject the workflow, or modify the workflow in some embodiments. See, for example, FIGS. 11-13, which are images 1100, 1200, and 1300 illustrating the workflow as received prior to modification, during modification when user is deleting an item from the workflow, and after modification of the workflow is completed by the user. This feedback may be captured and stored for subsequent retraining of the AI model to generate more efficient and personalized workflows.

Image-to-Workflow Generation

Figure 9:
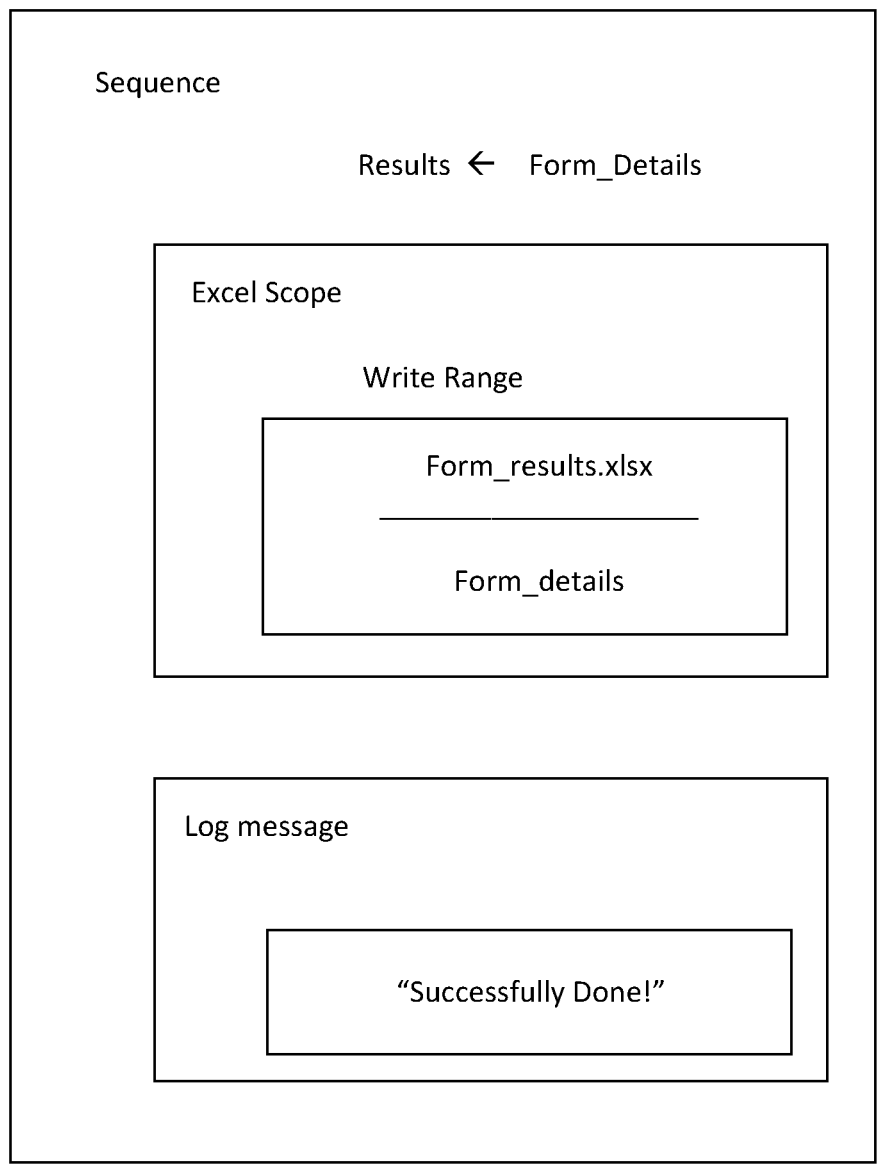
FIG. 9 is an image illustrating an RPA workflow created by the user, according to an embodiment of the present invention.

In image to workflow generation, in some embodiments, the RPA developer opens the RPA workflow development application and selects an image designer module. An image of the workflow having a sequence of text, a flowchart, a block diagram, etc. may be uploaded via the image designer module. See, for example, FIG. 9, which is an image 1000 illustrating an example workflow written on paper, according to an embodiment of the present invention. In this embodiment, image 1000 is fed into an AI model that processes the image using OCR, or causes OCR to be performed. The AI model may understand the requirements and logic, and map the components shown in the image into RPA activities to generate an RPA workflow. After the RPA workflow is built, the RPA developer may choose to use the workflow, reject the workflow, or modify the workflow in some embodiments. This feedback may be captured and stored for subsequent retraining of the AI model to learn about developer's style and how the developer creates the workflows.

The AI model can process a human-drawn image or a machine-drawn image to generate an RPA workflow in some embodiments. This allows the developer to draw an image on a piece of paper or create it in another software application when he or she is commuting or otherwise does not have access to a computing system with an RPA workflow development application to create the RPA workflow. However, it should be noted that in some embodiments, the RPA workflow development application may be on a mobile device, and the user may thus have access to the application wherever he or she is. As mentioned above, when the button to create the workflow is selected in some embodiments, the workflow is be created.

Audio-to-Text Generation

The RPA workflow development application of some embodiments may include or have access to a speech-to-text module. In such embodiments, the developer records an audio recording that pertains to an RPA workflow using a recording device (e.g., a mobile phone or laptop computer with a microphone). Once the developer has access to the RPA workflow development application, the developer may upload the audio file into an audio-to-workflow module, for example, and select a "create workflow" button. Internally, the audio file may be processed using the speech-to-text module. This module may convert the speech into text and then consumes the text in the same way as mentioned above in the other embodiments.

One or more embodiments decrease the time required for RPA developers to reproduce RPA workflows generated outside of an RPA workflow development application. The developer may write workflows in text format in a text or document editor application, write a flowchart on paper, etc. In such embodiments, there may be no predefined syntax as to how the sequence of logic steps are written. Further, some embodiments do not require the developer to have knowledge regarding the modules in the RPA workflow development application as he or she can produce the workflow idea in a text format. The model may be customized to fit the developer's preference and needs in some embodiments.

The process steps performed in FIGS. 6 and 7 may be performed by a computer program, encoding instructions for the processor(s) to perform at least part of the process(es) described in FIGS. 6 and 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 6 and 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for creating a robot process automation (RPA) workflow, comprising:
receiving a media file comprising a proposed workflow by way of a workflow development application on a computing system;
forwarding the received media file of the proposed workflow to a workflow generation module for processing;
accessing, by the workflow generation module, a model database to pull one or more workflow models, wherein the workflow generation module is an artificial intelligent (AI) model;
loading, by the workflow generation module, the one or more workflow models and predicting one or more workflows for a user of the computing system to select, wherein the predicting the one or more workflows for the user comprises
comparing a score of one or more previously trained models with a score of a current model to predict to the one or more workflows based on the received media file; and
transmitting, from the workflow generation module, a list of possible Extensible Application Markup Language (XAML) files comprising the one or more workflows to the workflow development application for the user to select.

2. The computer-implemented method of claim 1, wherein the media file is a text file of the proposed workflow, an image file of the proposed workflow, and/or an audio file of the proposed workflow, the workflow containing a sequence of logic steps.

3. The computer-implemented method of claim 1, wherein the media file is uploaded via the workflow development application.

4. The computer-implemented method of claim 1, further comprising:
performing, by the workflow generation module, optical character recognition (OCR) to the media file when the media file comprises an image file of the proposed workflow.

5. The computer-implemented method of claim 1, further comprising:
performing, by the workflow generation module, speech-to-text recognition to the media file when the media file comprises an audio file of the proposed workflow.

6. The computer-implemented method of claim 1, wherein the one or more workflow models is an AI model having a highest score among a plurality of previously trained AI models stored in a model inventory.

7. The computer-implemented method of claim 1, further comprising:
  display, by the workflow development application, the one or more workflows for the user to select; and
  receiving, at the workflow development application, a user selection for the one or more workflows.

8. The computer-implemented of claim 7, wherein the user selection comprises a selected workflow, a modified workflow, or a denied workflow.

9. The computer-implemented method of claim 8, further comprising:
  storing at a training database the selected workflow, the modified workflow, or denied workflow; and
  retraining the AI model with the selected workflow, the modified workflow, or the denied workflow.

10. The computer-implemented method of claim 9, further comprising:
  pushing the retrained AI model in the model database when metrics of the AI model are greater than metrics of a previous AI model.

11. A computer program embodied on a non-transitory computer-readable medium, the computer program configured to cause at least one processor to
  receive a media file comprising a proposed workflow by way of a workflow development application on a computing system;
  forward the received media file of the proposed workflow to a workflow generation module for processing;
  access, by the workflow generation module, a model database to pull one or more workflow models, wherein the workflow generation module is an artificial intelligent (AI) model;
  load, by the workflow generation module, the one or more workflow models and predicting one or more workflows for a user of the computing system to select, wherein when predicting the one or more workflows for the user comprises
    compare a score of one or more previously trained models with a score of a current model to predict to the one or more workflows based on the received media file;
  transmit, from the workflow generation module, a list of possible Extensible Application Markup Language (XAML) files comprising the one or more workflows to the workflow development application for the user to select.

12. The computer program of claim 11, wherein the media file is a text file of the proposed workflow, an image file of the proposed workflow, and/or an audio file of the proposed workflow, the workflow containing a sequence of logic steps.

13. The computer program of claim 11, wherein the media file is uploaded via the workflow development application.

14. The computer program of claim 11, wherein the computer program is further configured to cause the at least one processor to:
  perform, by the workflow generation module, optical character recognition (OCR) to the media file when the media file comprises an image file of the proposed workflow.

15. The computer program of claim 11, wherein the computer program is further configured to cause the at least one processor to:
  perform, by the workflow generation module, speech-to-text recognition to the media file when the media file comprises an audio file of the proposed workflow.

16. The computer program of claim 11, wherein the one or more workflow models is an AI model having a highest score among a plurality of previously trained AI models stored in a model inventory.

17. The computer program of claim 11, wherein the computer program is further configured to cause the at least one processor to:
  display, by the workflow development application, the one or more workflows for the user to select; and
  receiving, at the workflow development application, a user selection for the one or more workflows.

18. The computer program of claim 17, wherein the user selection comprises a selected workflow, a modified workflow, or a denied workflow.

19. The computer program of claim 18, wherein the computer program is further configured to cause the at least one processor to:
  storing at a training database the selected workflow, the modified workflow, or denied workflow; and
  retraining the AI model with the selected workflow, the modified workflow, or the denied workflow.

20. The computer program of claim 19, wherein the computer program is further configured to cause the at least one processor to:
  pushing the retrained AI model in the model database when metrics of the AI model are greater than metrics of a previous AI model.

21. A computing system, comprising:
  memory storing machine-readable computer program instructions; and
  at least one processor configured to execute the computer program instructions, the instructions configured to cause the at least one processor to:
    receive a media file comprising a proposed workflow by way of a workflow development application on a computing system;
    forward the received media file of the proposed workflow to a workflow generation module for processing;
    access, by the workflow generation module, a model database to pull one or more workflow models, wherein the workflow generation module is an artificial intelligent (AI) model;
  load, by the workflow generation module, the one or more workflow models and predicting one or more workflows for a user of the computing system to select, wherein the predicting the one or more workflows for the user comprises
    comparing a score of one or more previously trained models with a score of a current model to predict to the one or more workflows based on the received media file;
    transmit, from the workflow generation module, a list of possible Extensible Application Markup Language (XAML) files comprising the one or more workflows to the workflow development application for the user to select.

22. The computer system of claim 21, wherein the media file is a text file of the proposed workflow, an image file of the proposed workflow, and/or an audio file of the proposed workflow, the workflow containing a sequence of logic steps.

23. The computer system of claim 21, wherein the media file is uploaded via the workflow development application.

24. The computer system of claim 21, wherein the instructions are further configured to cause the at least one processor to:

perform, by the workflow generation module, optical character recognition (OCR) to the media file when the media file comprises an image file of the proposed workflow.

25. The computer system of claim 21, wherein the instructions are further configured to cause the at least one processor to:

perform, by the workflow generation module, speech-to-text recognition to the media file when the media file comprises an audio file of the proposed workflow.

26. The computing system of claim 21, wherein the one or more workflow models is an AI model having a highest score among a plurality of previously trained AI models stored in a model inventory.

27. The computing system of claim 21, wherein the instructions are further configured to cause the at least one processor to:

display, by the workflow development application, the one or more workflows for the user to select; and receiving, at the workflow development application, a user selection for the one or more workflows.

28. The computing system of claim 27, wherein the user selection comprises a selected workflow, a modified workflow, or a denied workflow.

29. The computing system of claim 28, wherein the instructions are further configured to cause the at least one processor to:

storing at a training database the selected workflow, the modified workflow, or denied workflow; and retraining the AI model with the selected workflow, the modified workflow, or the denied workflow.

30. The computing system of claim 29, wherein the instructions are further configured to cause the at least one processor to:

pushing the retrained AI model in the model database when metrics of the AI model are greater than metrics of a previous AI model.

* * * * *